US012499390B2

(12) United States Patent
Singh et al.

(10) Patent No.: US 12,499,390 B2
(45) Date of Patent: Dec. 16, 2025

(54) MULTIMODAL MOBILITY FACILITATING SEAMLESS RIDERSHIP WITH SINGLE TICKET

(71) Applicant: Hitachi, Ltd., Tokyo (JP)

(72) Inventors: Prasun Singh, San Jose, CA (US); Malarvizhi Sankaranarayanasamy, Mountain View, CA (US); Rahul Vishwakarma, Sunnyvale, CA (US); Ramyar Saeedi, Santa Clara, CA (US); Ravigopal Vennelakanti, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 408 days.

(21) Appl. No.: 17/674,601

(22) Filed: Feb. 17, 2022

(65) Prior Publication Data
US 2023/0259833 A1 Aug. 17, 2023

(51) Int. Cl.
*G06Q 10/02* (2012.01)
(52) U.S. Cl.
CPC .................................... *G06Q 10/02* (2013.01)
(58) Field of Classification Search
CPC ............................ G06Q 10/02; G06Q 10/025
See application file for complete search history.

(56) References Cited

U.S. PATENT DOCUMENTS

| | | | | |
|---|---|---|---|---|
| 2016/0098723 A1* | 4/2016 | Feeney | ................ | G06Q 20/065 705/75 |
| 2017/0357914 A1* | 12/2017 | Tulabandhula | ....... | H04W 4/025 |
| 2018/0114149 A1 | 4/2018 | Parker et al. | | |
| 2020/0127843 A1* | 4/2020 | Webster | ................ | H04L 63/102 |
| 2020/0134765 A1* | 4/2020 | Majima | .................. | G06Q 10/02 |
| 2021/0072033 A1* | 3/2021 | Husain | ................ | H04W 12/106 |
| 2021/0374786 A1* | 12/2021 | Simon | ................ | G06Q 30/0224 |
| 2022/0114655 A1* | 4/2022 | Chen | .................. | G01C 21/3697 |
| 2024/0177549 A1* | 5/2024 | Sudou | .................... | G08G 1/127 |

FOREIGN PATENT DOCUMENTS

CN          106104619 B          1/2020

OTHER PUBLICATIONS

Nguyen et al., "Blockchain-based Mobility-as-a-Service," 2019 28th international conference on computer communication and networks (icccn), pp. 1-6. IEEE (Year: 2019).*
Muraine "Transportation 4.0: Multimodal transportation systems" In: Technology. May 17, 2020. Retrieved on Mar. 26, 2021 from <https://technologymagazine.com/ai-and-machine-learning/transportation-40-multimodal-transportation-systems> entire document, 3 pages.

* cited by examiner

*Primary Examiner* — Resha Desai
*Assistant Examiner* — Patrick Kim
(74) *Attorney, Agent, or Firm* — Procopio, Cory, Hargreaves & Savitch LLP (57) ABSTRACT

The invention provides seamless journey experience for passenger in multimodal mobility travel using a single ticket for different trip sections and when multimodal operators provide passenger proof-of-transit, smart contracts enable automated fare disambiguation among them. The single truth of passenger travel journey on single ticket in multimodal mobility helps to also develop incentivizations/rewards for passengers, and incentivize modal operator's based on service level agreements in a consortium.

13 Claims, 8 Drawing Sheets

MULTIMODAL MOBILITY FACILITATING SEAMLESS RIDERSHIP WITH SINGLE TICKET

BACKGROUND

Field

The present disclosure is generally directed to multimodal mobility (MMM) systems, and more specifically, for facilitating multimodal mobility ridership with a single ticket.

RELATED ART

Multimodal Mobility (MMM) is a fast-growing trend for integrating multimodal transport operators enabling passengers to travel on a single ticket regardless of differing transport modes and tickets in their journey. Although individual transport operators have formed agreements for allowing passengers to pay by a single payment system such as smart card, there is lack of integrated operations such as letting passengers travel on single ticket.

Figure 1:
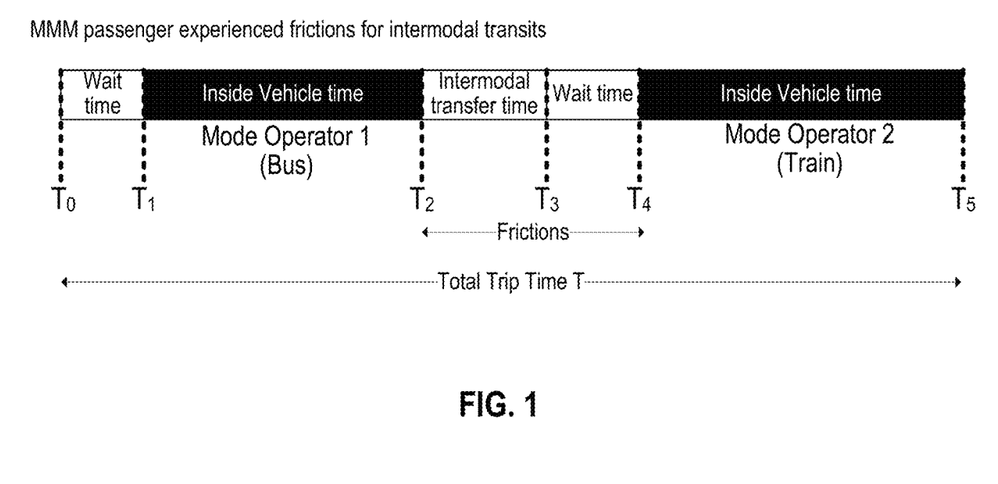
FIG. 1 illustrates an example of MMM passenger experienced frictions for intermodal transits.

FIG. 1 illustrates an example of MMM passenger experienced frictions for intermodal transits. Passengers experience a lot of friction along their journey when moving from one mode of transport to another, such as collecting the next trip ticket, revalidating the ticket, and so on due to the low level of integration among multimodal operators.

Passenger experience for using multimodal travel journey requires multimodal operator integration for various phases of passenger journey, from trip planning, trip booking, fare payments and revenue disambiguation between multimodal operators, ability to re-route or make changes in trip reservation and finally the ability for receiving feedback of the journey experience from the passenger. There is a need to provide seamless journey for passenger and track operations of multimodal operators on single ticket of multimodal consortium.

SUMMARY

Passenger experience significant friction while transferring from one operator to another during intermodal transfers due to legacy systems and the lack of integration among operators (e.g. transfer from bus to rail transit section of trip requires separate tickets, changes to trip sections not allowed, and so on). There is lack of a single truth, and also a lack of integration among the multimodal partners for applications such as trip planning that could involve the sharing of timetables. There is increased demand from passengers to travel on a single ticket within a multimodal transit network to reduce transfer and waiting time during intermodal transfers.

Example implementations described herein are directed to facilitating a seamless journey for passenger and track operations of multimodal operators on single ticket of multimodal consortium.

Aspects of the present disclosure can involve a method, which can involve receiving trip criteria; determining a trip route based on the trip criteria, the trip route including a plurality of sections and a plurality of modes of transportation for each section of the trip route, each section serviced by a modal mobility operator of multiple modal mobility operators; creating a digital single ticket comprising a single ticket for the plurality of sections of the trip, the digital single ticket being a smart contract with the multiple modal mobility operators; and dynamically updating the digital single ticket based on one or more operational events from one or more of the multiple modal mobility operators.

Aspects of the present disclosure can involve a computer program, which can involve instructions involving receiving trip criteria; determining a trip route based on the trip criteria, the trip route including a plurality of sections and a plurality of modes of transportation for each section of the trip route, each section serviced by a modal mobility operator of multiple modal mobility operators; creating a digital single ticket comprising a single ticket for the plurality of sections of the trip, the digital single ticket being a smart contract with the multiple modal mobility operators; and dynamically updating the digital single ticket based on one or more operational events from one or more of the multiple modal mobility operators. The computer program and instructions can be stored on a non-transitory computer readable medium and executed by one or more processors.

Aspects of the present disclosure can involve a system, which can involve means for receiving trip criteria; means for determining a trip route based on the trip criteria, the trip route including a plurality of sections and a plurality of modes of transportation for each section of the trip route, each section serviced by a modal mobility operator of multiple modal mobility operators; means for creating a digital single ticket comprising a single ticket for the plurality of sections of the trip, the digital single ticket being a smart contract with the multiple modal mobility operators; and means for dynamically updating the digital single ticket based on one or more operational events from one or more of the multiple modal mobility operators.

Aspects of the present disclosure can involve a system which can involve at least one memory storing instructions; and at least one processor coupled to the storage device and configured to execute the instructions to receive trip criteria; determine a trip route based on the trip criteria, the trip route comprising a plurality of sections and a plurality of modes of transportation for each section of the trip route, each section serviced by a modal mobility operator of multiple modal mobility operators; create a digital single ticket comprising a single ticket for the plurality of sections of the trip, the digital single ticket being a smart contract with the multiple modal mobility operators; and dynamically update the digital single ticket based on one or more operational events from one or more of the multiple modal mobility operators.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are directed to level 3 (integration of service offer) and level 4 (integration of societal goals) in the MMM levels of operator integration. This is a kind of integration that the MMM industry is actually mapping. Currently, most related art implementations are at level 1 (integration of information) or level 2 (integration of booking/payment).

Figure 2:
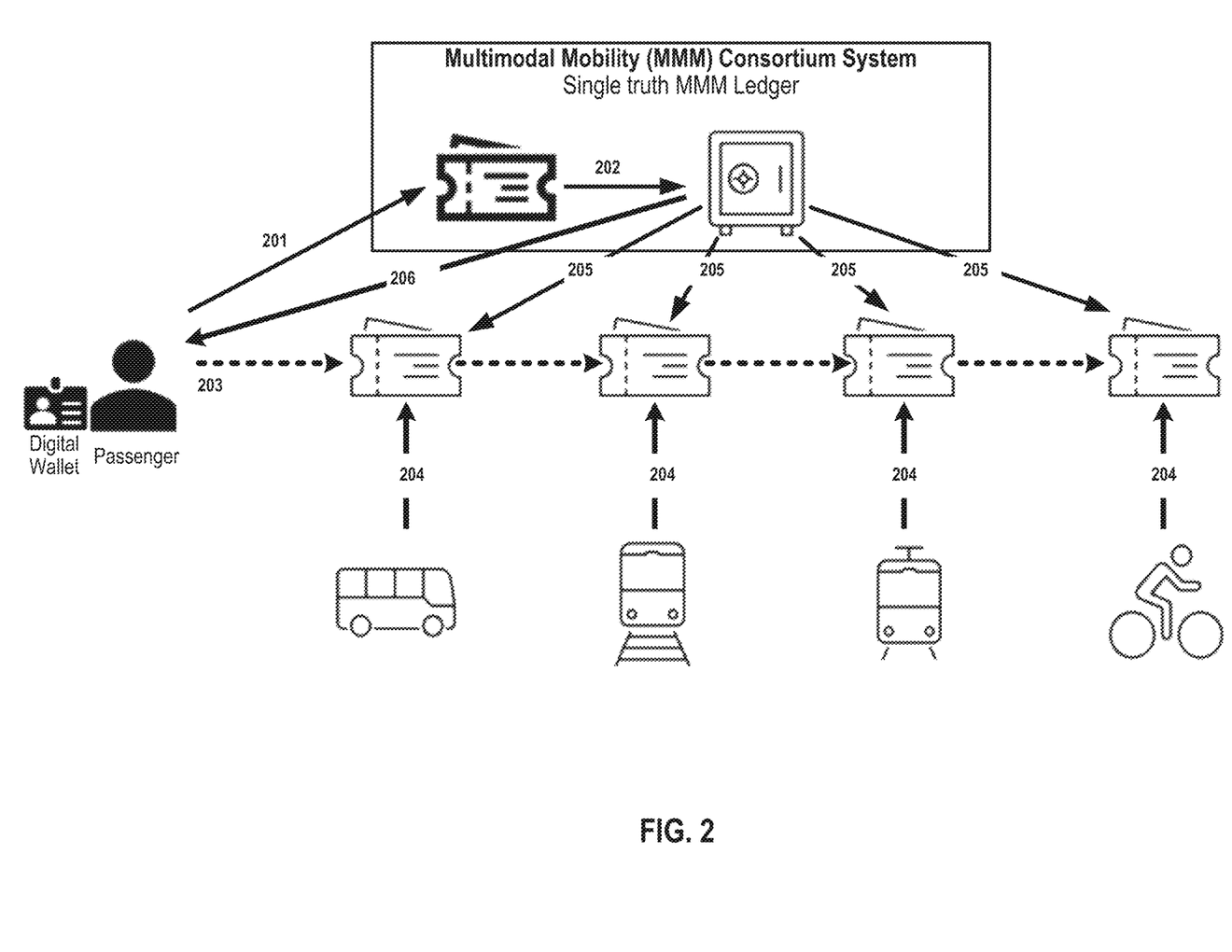
FIG. 2 illustrates an example overview of the single ticketing features, in accordance with an example implementation.

FIG. 2 illustrates an example overview of the single ticketing features, in accordance with an example implementation. Example implementations described herein involve a single ticket created as Digital Single Ticket (DST) to travel on all trip sections operator by operators such as Bus, Rail, and so on. Passengers can have dynamic changes made to DST based on the actual trip conditions during the travel in the MMM Trip such as add/update a new leg of the journey, new route, new fare change, and so on. The DST registers/subscribes for receiving operational events from the MMM blockchain channel (e.g., from Bus, Rail, Metro, and so on), that are mode operators in the trip booked by the passenger and that impact the passenger trip routes (e.g. delay in rail arrival time, slow traffic on road, and so on). Further, on receiving operational events from the MMM blockchain channel, the single ticket application gets suggestions/recommendations for route changes from the MMM analytics engine, and passengers can easily change the route in the trip for the DST.

Example implementations described herein further involve facilitating operator fare disambiguation and release of partial fares as follows. The transport operator on whose transit the passenger has travelled on the single ticket (e.g., paper copy or digital) uses a combination of the following to submit a proof-of-transit in their section of travel by passenger for sharing the escrowed MMM fare:

Sensor fusion: combining data from operator asset-based Internet of Things (IoT) systems (e.g., rail transit gates for allowing Passenger-IN/Passenger-OUT in operator network), the data involving video, bar-code reader, and so on.

Operator Asset-free passenger tracking by using passenger devices such as their cell phone that has Global Positioning Satellite (GPS), accelerometer, compass, and so on (e.g., for live mobile tracking during transit) to detect passenger mode of travel and hence derive presence/absence in the operator transit network (i.e., derive presence/absence regarding whether the passenger travelling in bus or rail).

In the absence of the above, example implementations can use passenger behavior analytics from the MMM analytics engine to implicitly derive likelihood of passenger presence/absence in the operator network.

In example implementations, during the intermodal transfer of passenger (e.g., from bus to rail), there is Passenger-OUT from the bus and the bus operator submits the above Proof-of-Transit to the MMM blockchain channel. The Proof-of-Transit for DST executes the single ticket smart contract that calculates the probability of passenger travel in the bus and uses the fare sharing agreements among the operator organizations in the MMM blockchain channel to release the partial fare of DST for the bus.

Passenger who is carrier of the single ticket (paper or digital) can have access to next best transit option during journey, thereby reducing the wait time or the transfer time for the next modal change as follows.

When the DST receives operator events from the MMM Blockchain channel, the analytics engine from the MMM solution that is used for trip planning can suggest/recommend new routes or next best transit options for the remaining portion of passenger journey. The passenger can choose to accept the recommendation for the next best transit option and the single ticket routes will change with the escrow fare adjusted accordingly for the trip change for the remaining portion of the passenger journey.

Further, the passenger having the single ticket (paper copy or digital) can be incentivized for current or future travels, and modal operators can be incentivized or penalized based on agreements and data stored on the single truth MMM channel ledgers as follows. When the passenger completes the entire trip and thus is at the end of the journey, the DST has operational events and Proof-of-Transits from the modal operators such as bus, rail, metro, and so on, are present as single truth on the MMM blockchain channel. The DST track and trace data on the MMM blockchain channel can be used to build incentivization such as a partial fare refund, or reward points to the passenger due to the travel delay in the operator network (e.g. bus will compensate the passenger for delay caused due to bus breakdown). The reward points to the passenger for usage of MMM can be redeemed for new trips or otherwise in the single ticketing application.

The operational events from the operators such as bus, rail, and the passenger feedback/experiences about the journey on the DST are available as single truth data on the MMM blockchain channel which can be used to build incentivization or penalties for modal operators such as a larger share/reduced share of passenger fare in the MMM consortium. The operator service level agreements (SLAs) smart contracts on the MMM Blockchain channel implement these rewards/penalties (e.g. the bus will be rewarded for meeting SLAs, rail will be penalized for delays in arrival time, and so on).

Example implementations also involve a single ticketing application with a digital wallet for passengers travelling in MMM as follows. A copy of the single ticket is stored digitally and is known as a DST. Identity validation for the passenger identity is stored from Identity (ID) service providers participating in the MMM blockchain channel such as government citizen database (DB), payment systems ID, Company Employee DB, and so on for identifying recipients of sponsored benefits such as reduced fare for senior citizens, youth, companies encouraging employees to use MMM, and so on. Passenger identity and DST trip tracking can be used by transit organizations to audit and compensate for operator loss of fare due to implementing welfare schemes for citizens for transportation (e.g., reduced fare on rail for low-income families and senior citizens, free bike rentals for companies promoting green energy transportation among their employees, and so on). Payment fare value can be stored as digital currency or reward points for MMM trip payments. Additionally, health validations are stored from health service providers in the MMM blockchain channel required for passenger travel (e.g. COVID tests, vaccine report, and so on).

The various MMM operators as well as the service providers are onboarded onto the proposed MMM consortium blockchain ledger, which facilitates the execution of smart contracts and for which output from the analytics will be used as a part of building a single truth among the consortium participants. All of the operators who need to provide proof of transit the passengers as well as operational details of their transport asset infrastructure or transportation infrastructure will be onboarded in accordance with the desired implementation.

In the example of FIG. 2, a passenger books a ticket at 201 through the mobile application. The mobile application generates an application involving a digital wallet, wherein the digital single ticket can be stored in the application. To book a ticket, the MMM consortium system receives the trip criteria (e.g., starting point to destination, included/excluded modes of transport, time schedule, and so on) and determines a trip route based on the trip criteria according to analytics as implemented in accordance with the desired implementation. The trip route can involve sections and mode and the plurality of modes of transportation for each section of the trip route, each section serviced by a modal mobility operator of multiple modal mobility operators as illustrated in FIG. 2. Once the route is determined, a digital single ticket involving a single ticket is generated for the plurality of sections of the trip, the digital single ticket being a smart contract with the multiple modal mobility operators.

The ticket is provided into the digital wallet of the passenger which is also provided to the MMM consortium system. At 202, the payment for the digital ticket is locked in the escrow systems. In this example of FIG. 2, the passenger books a single ticket for trip which starts with bus journey at 203, but the routes further involve a multimodal transport over rail, metro, and bike as well. At 204, each of the multimodal operators provide a proof-of-transit for the journey section once completed by passenger on the trip section operated by individual multimodal operator (e.g., Proof-of-Transit Bus Journey, Proof-of-Transit Rail Journey, Proof-of-Transit Metro Journey, Proof-of-Transit Bike). Based on the proof-of-transit, the MMM consortium system provides a consensus based payment to the individual operators for their respective trip section accordingly at 205. The MMM consortium system dynamically updates the digital single ticket based on such one or more operational events from one or more of the multiple modal mobility operators. Once trip is complete, an incentivization for the passenger can also be provided at 206. Further details of the process are provided with respect to FIG. 4.

Figure 3:
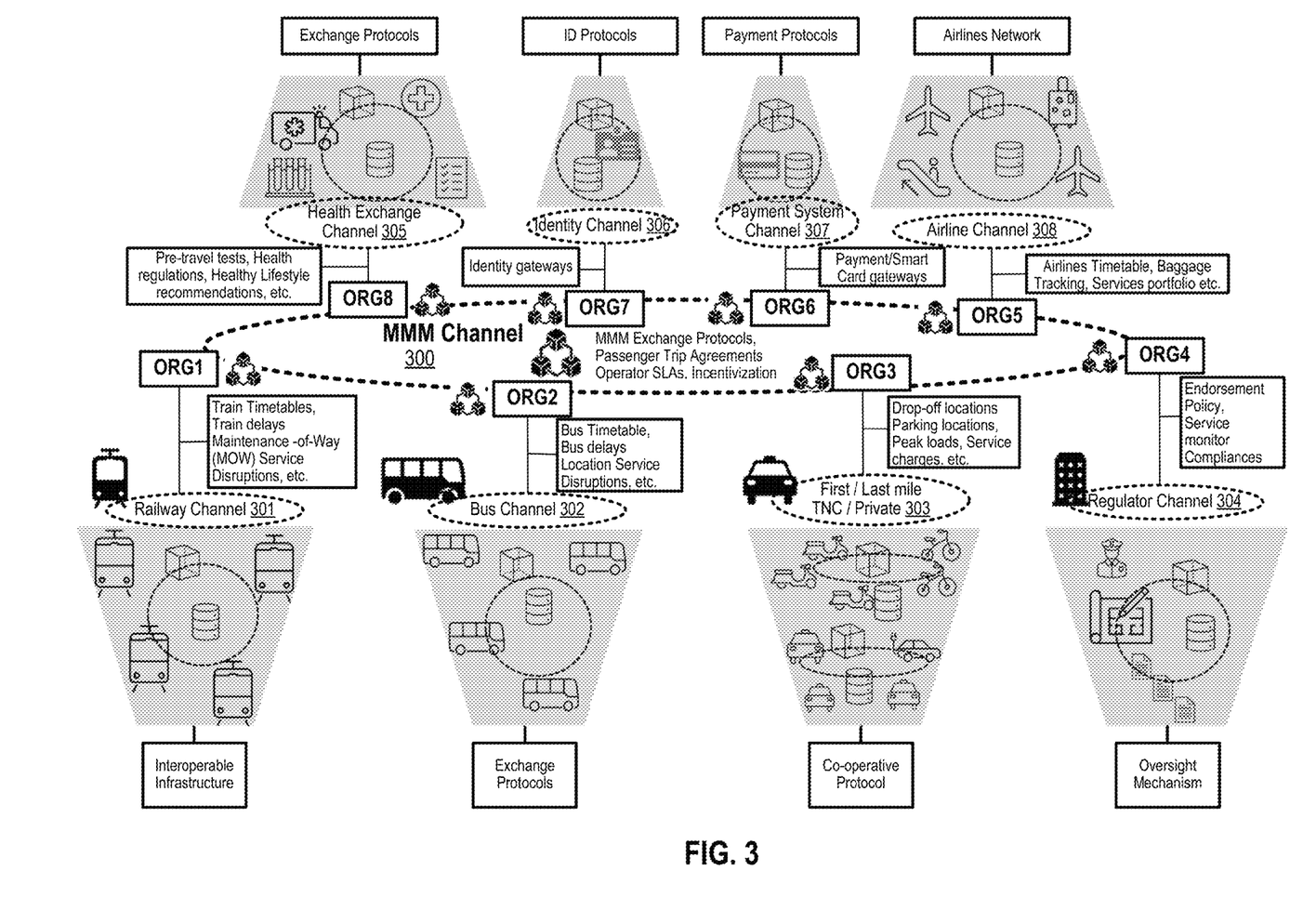
FIG. 3 illustrates an example of the single truth MMM blockchain ledger having MMM smart contracts on the MMM consortium blockchain, in accordance with an example implementation.

FIG. 3 illustrates an example of the single truth MMM blockchain ledger having MMM smart contracts on the MMM consortium blockchain, in accordance with an example implementation. Specifically, FIG. 3 illustrates at the consortium level the extent of the organizations and various independent channels that will participate in the MMM blockchain ledger. In the middle of the MMM blockchain ledger, there is a consortium MMM channel 300 which manages the MMM exchange protocols, the passenger agreements, the operator service level agreements (SLAB), valuation/incentivization protocol, as well as all other kinds of agreements between the organizations.

At the bottom, there are various transport operators. In the example of FIG. 3, there is a rail company having its own rail channel 301, which will manage data from its various rail assets, the interoperative transportation infrastructure, the train time tables, train delays, maintenance of rail which has impact on the time tables, and so on. All this information can be shared on the MMM channel 300. Bus companies can have a bus channel 302 to facilitate the sharing of information of the buses, such as bus time table, bus delays, locations, and so on, on the MMM channel 300. The transportation network companies such as ridesharing companies or taxi companies facilitate the first and last mile channel 303, which can involve a cooperative protocol to share data regarding drop off locations, parking locations, and so on, through the MMM channel 300. The regulator channel 304 can involve entities such as the transportation authority, which is responsible for analyzing how the transportation network is operating. For example, they might have an enforcement policy, monitor the services for compliance, or enforce a minimum price around the fare system. All such information can be shared to the MMM channel 300.

Other transport networks can also be onboarded to the MMM channel 300 depending on the desired implementation. For example, the airline channel 308 can share the airline time table, baggage tracking, and so on to the MMM channel 300. For the payment or any information regarding incentives, such information is shared to the onboard payment systems, the smart card gateways and other payment protocols onto the MMM channel 300 through the payment system channel 307 and identity channel 306 to verify the passenger and provide a ticket during actual travel on the mode of transport. If there are any health restrictions then the health exchange channel 305 provides health regulations, healthy life style recommendations and so on.

Through the system of FIG. 3 in conjunction with the system of FIG. 2, identity validations, travel authorization, and health compliance certificates can be obtained stored in the application as part of the DST. Further details are provided with respect to FIG. 4.

Figure 4:
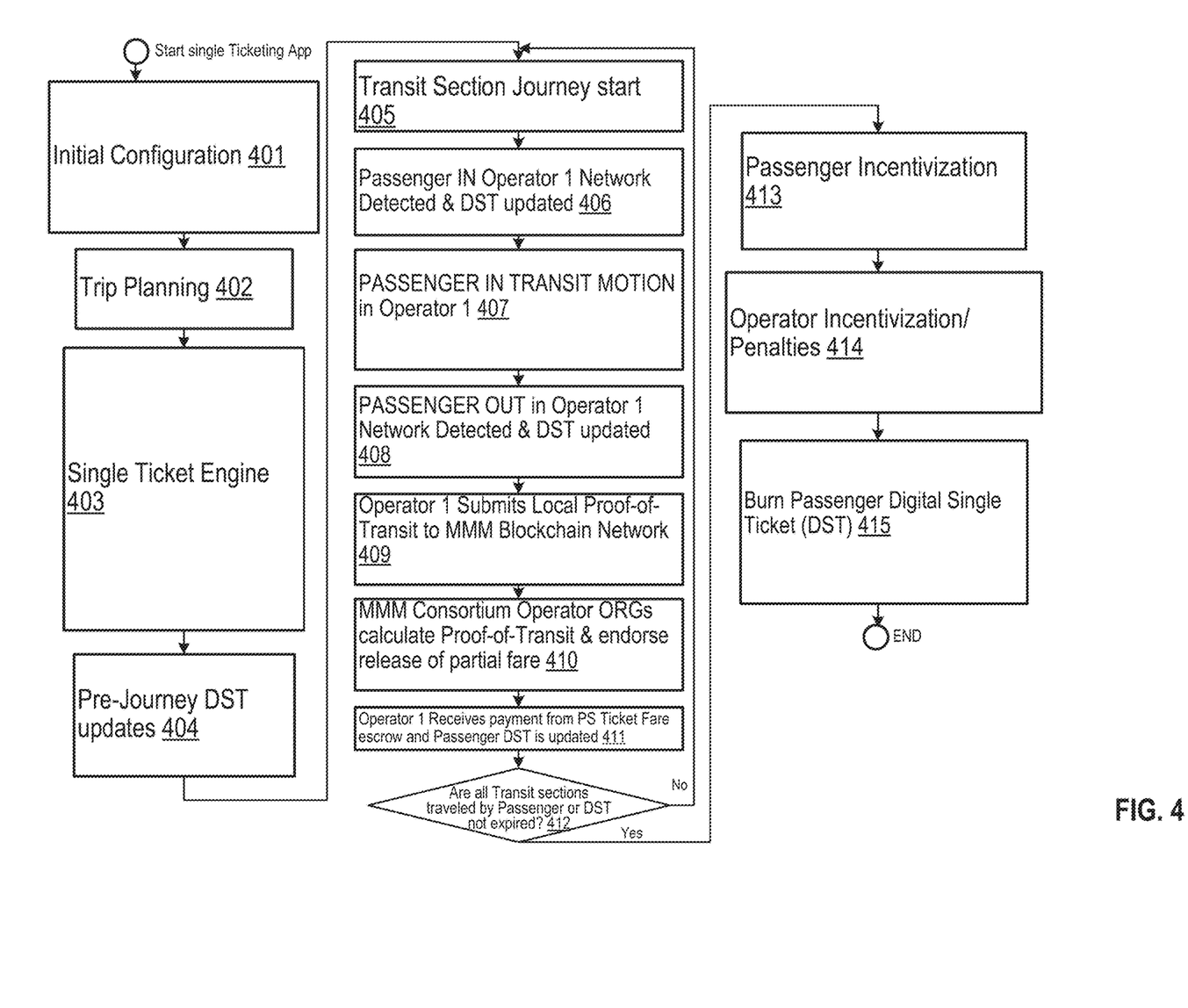
FIG. 4 illustrates an example workflow for seamless ridership with single ticket, in accordance with an example implementation.

FIG. 4 illustrates an example workflow for seamless ridership with single ticket, in accordance with an example implementation. Elements of FIG. 4 will be made in reference to the system illustrated in FIG. 5. At 401, the initial configuration is conducted. During the initial configuration, the workflow initializes the passenger digital wallet for the latest passenger identity validations, transport, and so on from the identity (ID) service provider, the latest authorization to travel and health compliance certificates from the health service provider, and obtains a non-zero digital cash/payment from payment system (PS). Thus, the initial configuration for the passenger digital wallet with the latest passenger identity validations and/or transport rules from identity service provider is conducted. The authorization for travel and health compliance certificates from health service provider can be obtained as needed or digital cash or payment from payment system can be obtained and stored in the digital wallet.

At 402, the workflow conducts the trip planning, wherein the passenger can view the trip options from source to destination and select the trip option to form the trip criteria.

At 403, the workflow executes the single ticket engine. The workflow checks the digital cash balance, then instructs the payment system to apply the ticket fare escrow. Next, the single ticket contract can be created on the MMM blockchain as a DST. The DST is created from the MMM blockchain and stored in the single ticket wallet DST which can be in the form of a program encoded portable digital asset that updates its state from the MMM Blockchain. The DST subscribes to MMM events and stores these events as a state update. The copy of the DST can be stored in Cloud or can be recreated from MMM Blockchain.

At 404, the workflow executes pre-journey DST updates. DST can receive updates for any transit section and change its state. Further, the passenger can configure the single ticketing app to make automatic route changes based on preferences. In this manner, the system can always receive updated trip criteria and dynamically update the digital single ticket based on the updated trip criteria.

At 405, the workflow executes the transit section journey start. DST receives updates from the MMM channel (e.g. new travel guidelines) and checks the DST validity to travel and updates its validation state into the MMM Blockchain channel.

In the following flow, for each section of the trip route, the system acts to detect a passenger corresponding to the digital single ticket in a network of a modal mobility operator servicing a respective section of the trip route based on IoT devices of the modal mobility operator detecting the passenger through sensor fusion, a device of the passenger detecting the passenger in the network of the modal mobility operator such as a mobile device, and a multiple modal mobility analytics engine detecting the passenger in the network of the modal mobility operator; and update the digital single ticket based on detecting the passenger. Depending on the desired implementation, the update can also involve information collected from these devices to update and correlate with parameters of digital single tickets (e.g. associating info collected by devices such as ride quality, route preferences (cost, carbon footprint, time duration, transfer time etc.) observed or requested with modal operator service level agreement (SLA)).

At 406, the passenger is detected in the modal operator 1 network, and the DST is updated accordingly. In example implementations, operator IoT Devices can be used to detect the passenger transiting to another modal network, or the passenger mobile device can be used to derive the modal operator network, or the passenger can be predicted on modal operator network based on the MMM analytics engine.

At 407, suppose the passenger is in transit motion in operator 1. The operator 1 Internet of Things (IoT) Devices (e.g. Video Cameras, LiDAR, and so on) can detect the passenger safety compliance events. Passenger mobile devices facilitate live tracking (e.g. GPS location, Speed of travel etc.). The MMM route planner analytics engine recommends new routes for next trip sections to Passenger for making route changes.

In the following flow, the system detects the transit motion of a passenger corresponding to the digital single ticket in the network of the modal mobility operator serving the respective section of the trip route based on one or more of a device of the modal mobility operator detecting the passenger, a device of the passenger detecting the passenger in the network of the modal mobility operator, and the multiple modal mobility analytics engine detecting the passenger in the network of the modal mobility operator. Further details are also illustrated with respect to FIG. 5. At 408, the IoT devices of modal operator 1 detects that the passenger is out of the network, and the DST is updated accordingly. The passenger mobile device can be used to detect passenger out state. The passenger out state can be derived by the MMM analytics engine. At 409, the modal operator 1 submits a local Proof-of-Transit to the MMM Blockchain network. Modal operator 1 syncs with latest passenger DST and submits the DST update to the MMM Blockchain to derive Proof-of-Transit for MMM fare release.

In the following flow, the system checks a digital balance of the digital wallet and applies a fare for the digital single ticket to an escrow account. Escrow validation is a part of the smart contract because the non-repudiation of escrow account is inherent in a distributed ledger system.

At 410, the MMM Consortium Operator organizations calculate the proof-of-transit and endorse release of the partial fare. The DST update submitted by modal operator 1 is used by each modal operator in the trip route to calculate the probabilistic proof-of transit and endorse partial fare release for the transit section travel.

At 411, the modal operator 1 receives payment from the PS Ticket Fare escrow and passenger DST is updated accordingly.

At 412, a determination is made as to whether all transit sections for the trip have been traveled by the passenger or whether the DST has not yet expired. If so (Yes), then the flow proceeds to 413, otherwise (No), the flow proceeds to 405 to handle the next portion of the trip.

At 413, the passenger incentivization process is executed. Passenger DST is used to calculate incentivization values for the trip based on operational events and past travel history of passenger, and is submitted to MMM Blockchain channel for the update. If the update is successful then the passenger wallet is updated to receive incentives such as travel reward miles/points.

At 414, the operator incentivization/penalties process is executed. Passenger DST is used to calculate incentivization, or penalties for multimodal operators based on operational events such as trip section delays and passenger feedback which is then submitted to the MMM blockchain channel for executing the Operator service level agreements (SLAs) agreements smart contracts. If the update is successful then operators are incentivized or penalized accordingly.

At 415, the MMM consortium blockchain ledger burns the passenger digital single ticket on trip completion. In the examples described herein, burning the DST means that the DST state is updated as an expired state and thus marked for not allowing to make any changes to the DST on blockchain. The DST is expired for travel and is now just like an archive record to be stored in past travel history that cannot be changed/updated. If all sections of trip are travelled by the passenger-using DST then the DST is updated as an expired state on the MMM blockchain. If time duration or the single ticket contract is invalid, then DST is updated as an expired state on the MMM blockchain. The expired DST cannot be updated further and can be removed from a passenger wallet.

Through the flow as illustrated in FIG. 4, the example implementations can facilitate seamless passenger travel through the use of a single ticket in the MMM, as well as facilitate fare disambiguation for multimodal operators. Various use cases are possible through the flow illustrated in FIG. 4. For example, the DST is utilized as a dynamically updated travel contract (403 to 413). Proof-of-Transit can also be provided as needed (409 to 411), and the user can also be informed of the best next mode of transport (404,

407). Further, passenger incentivization can be provided (413) as well as operator incentivization/penalties (414).

Passenger MMM digital wallet can be provided (401, 413), as well as an operator occupancy score (403, 407).

Figure 5:
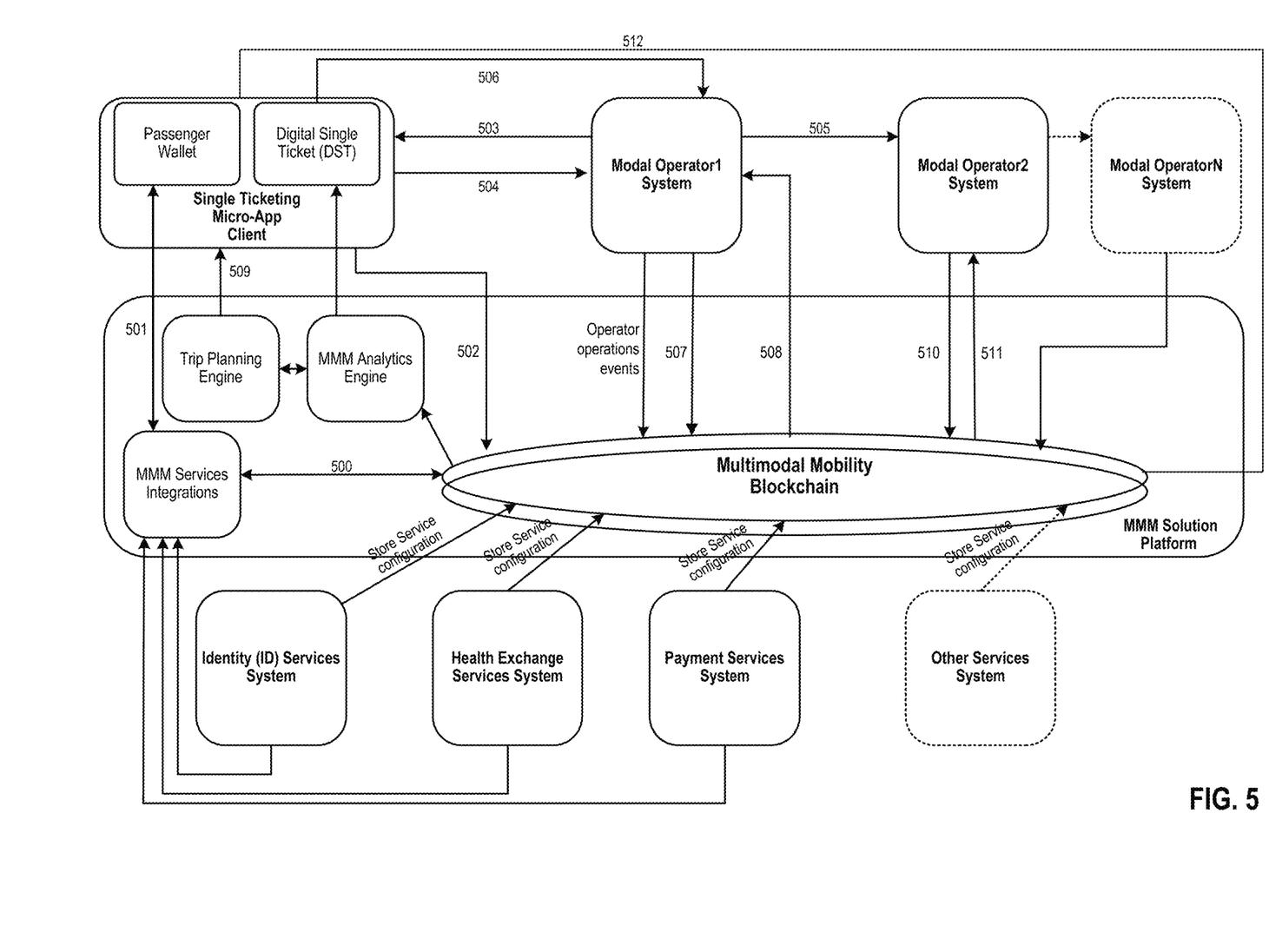
FIG. 5 illustrates an example system architecture for the single ticketing interaction flow, in accordance with an example implementation.

FIG. 5 illustrates an example system architecture for the single ticketing interaction flow, in accordance with an example implementation. As shown herein, the digital single ticket is subscribed to operational events. The operational events are stored as updates to states of the digital single ticket, and the dynamically updating the digital single ticket can involve updating the states of the digital single ticket based on the stored operational events. In an example execution of the system architecture of FIG. 5, at first, the MMM services integrations fetches services configurations from the MMM blockchain at 500. At 501, the MMM services integrations validates the identity of the passenger, extracts the travel health guideline, facilitates payments, and so on, from the passenger wallet in the single ticketing micro-application client. At 502, the single ticketing micro-application client creates the DST on the MMM blockchain, and escrow fare on trip booking to the MMM blockchain.

At 503, suppose the passenger proceeds to go on the travel. The passenger is detected as IN based on sensor fusion of the first mobility operator, which transmits the signal of the detection to the single ticketing micro-application client. At 504, the IN detection of the passenger is detected by the passenger cell phone from the first mobility operator.

At 505, when the passenger leaves the area managed by the first mobility operator, the OUT status of the passenger is detected by the sensor fusion of the first mobility operator, the state of which is provided to the second mobility operator. At 506, the passenger OUT status is detected by the passenger cell phone and provided to the first mobility operator.

At 507, the proof-of-transit for DST is submitted by the first mobility operator to the MMM Blockchain along with corresponding operator operations events.

At 508, the portion of fare for the first mobility operator is released from escrow to the first mobility operator. At 509, the trip route recommender recommends the next trip section route to the passenger based on the trip planning module and the MMM analytics engine.

At 510, suppose that the second mobility operations encounters some delay events and the events are provided to the MMM blockchain. At 511, a penalty is incurred from the MMM blockchain to the second mobility operator. Accordingly, the system can receive updates from any of the multiple modal mobility channels and check the validity of the digital single ticket based on the received updates at any time. If validation states need to be updated, then the system can update the validation states of the digital single ticket into the smart contract.

Finally at 512, at the end of the trip, the passenger is incentivized as reward points are added to the passenger wallet by the MMM blockchain.

Figure 6:
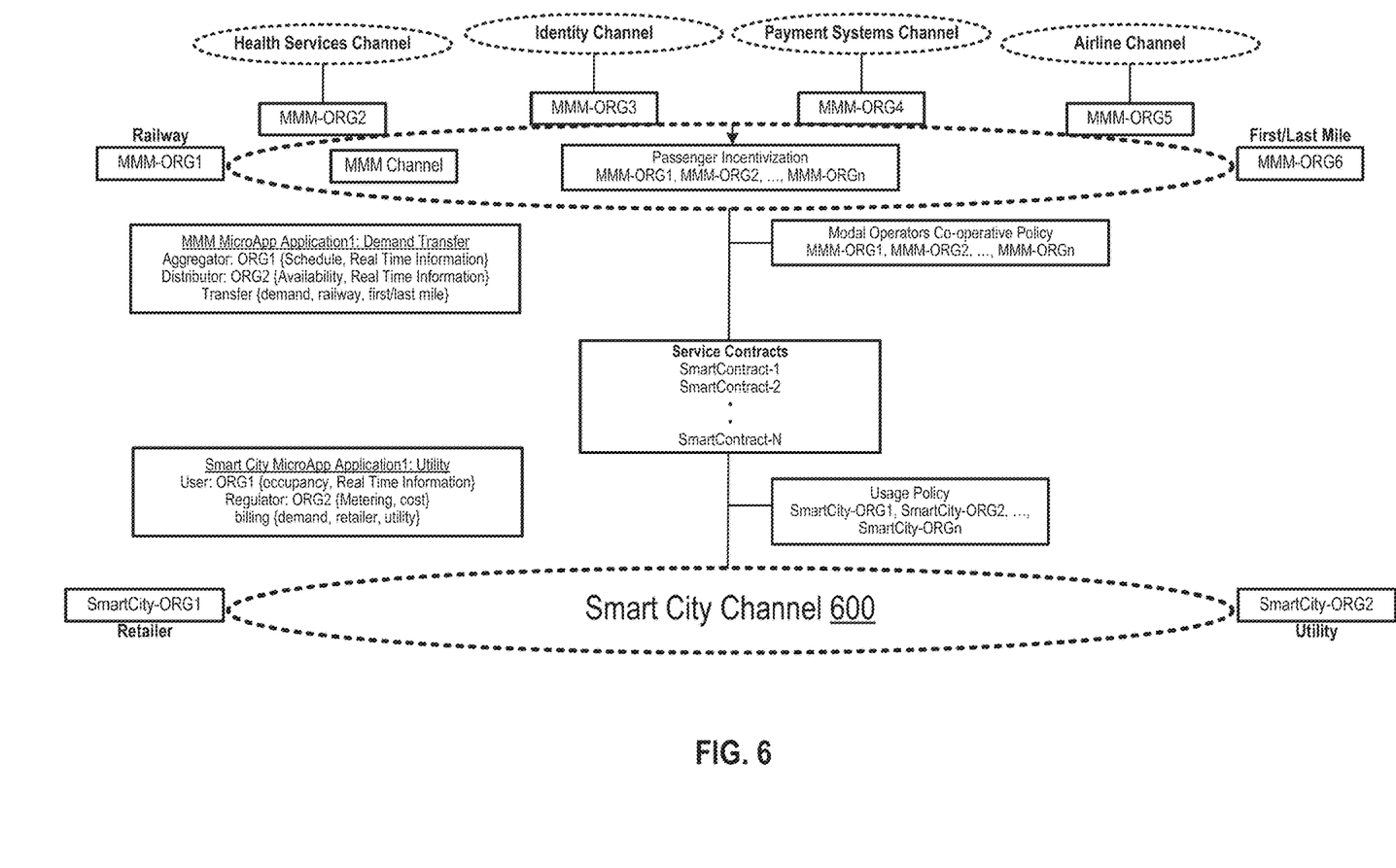
FIG. 6 illustrates an example of MMM extensions, in accordance with an example implementation.

FIG. 6 illustrates an example of MMM extensions, in accordance with an example implementation. Multimodal Mobility can be extended to other business domains such as smart cities as illustrated in FIG. 6. The example implementations described herein are described with respect to use for single ticketing MMM in a particular MMM domain, but can be extended to other domains such as a smart city which can have a smart city channel 600 that also provides information to the MMM channel in a similar fashion to FIG. 3. In an example of a smart city implementation, the MMM channel can incentivize passengers who are using desired mode of transport such as electric bus or other green energy solutions, which is integrated into a smart contract for the smart city organization, for which the smart city organization will provide corresponding information. The smart city application can share information about the mobility companies, corresponding regulators, cost use, payment information whether it is coming as a service from the retailers. Thus, the present disclosure can facilitate MMM exchanges which can involve smart city or other desired organizations, such as energy companies, utility companies, channels from the electric vehicle ecosystem, and so on.

Figure 7:
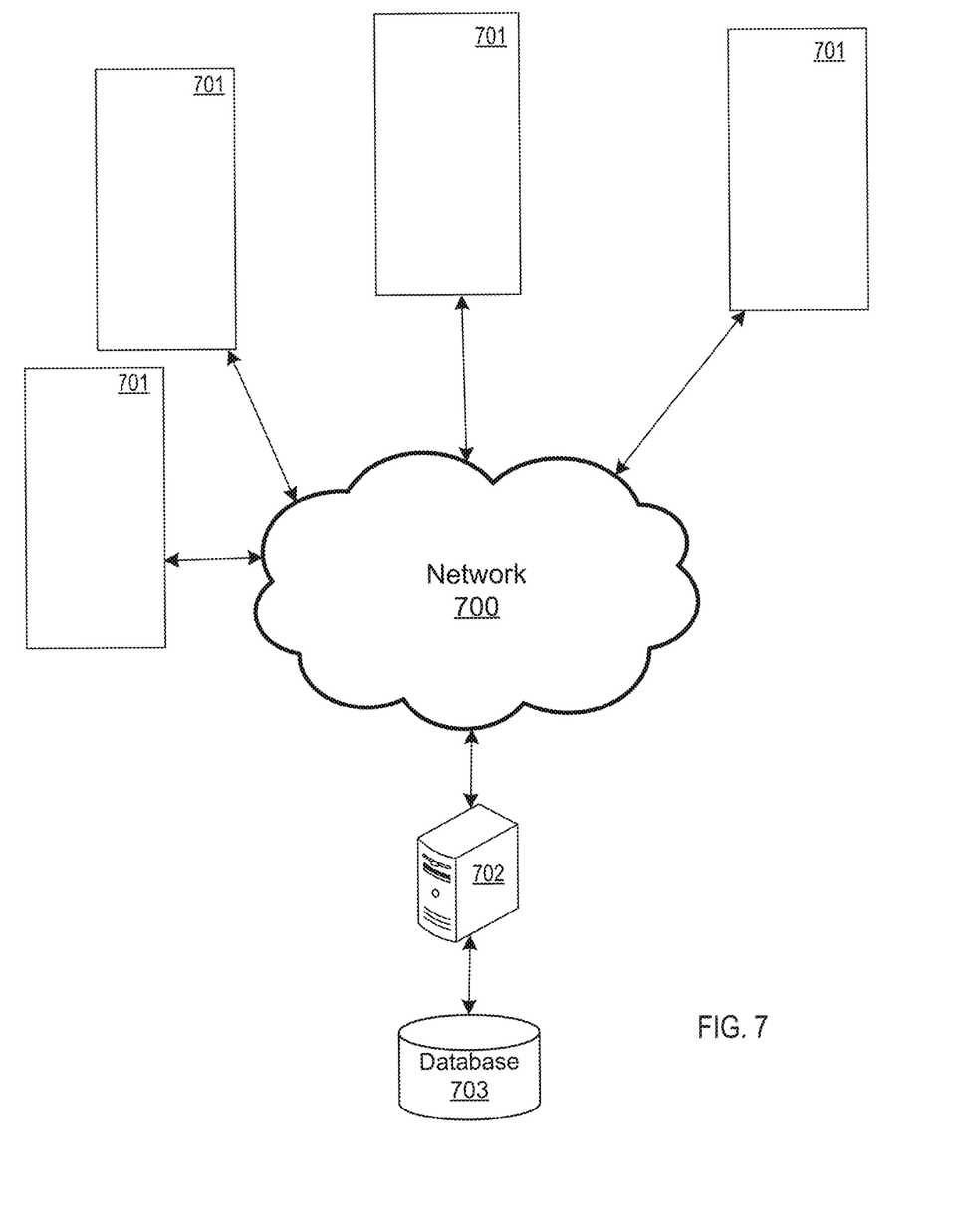
FIG. 7 illustrates a system involving a plurality of multimodal operator assets networked to a management apparatus, in accordance with an example implementation.

FIG. 7 illustrates a system involving a plurality of multimodal operator assets networked to a management apparatus, in accordance with an example implementation. One or more assets 701 are communicatively coupled to a network 700 (e.g., local area network (LAN), wide area network (WAN)) through the corresponding on-board computer or Internet of Things (IoT) device of the assets 701, which is connected to a management apparatus 702 facilitating the MMM blockchain and ledger. The management apparatus 702 manages a database 703, which contains historical data collected from the assets 701 and also facilitates remote control to each of the assets 701. In alternate example implementations, the data from the assets can be stored to a central repository or central database such as proprietary databases that intake data, or systems such as enterprise resource planning systems, and the management apparatus 702 can access or retrieve the data from the central repository or central database. Depending on the desired implementation, the central repository or central database can be replaced with a distributed/decentralized/peer-to-peer solution instead. Asset 701 can involve any physical system for use in a physical process such as an assembly line or production line, in accordance with the desired implementation, such as but not limited to air compressors, lathes, robotic arms, and so on in accordance with the desired implementation. The data provided from the sensors of such assets 701 can serve as the data flows as described herein upon which analytics can be conducted.

Figure 8:
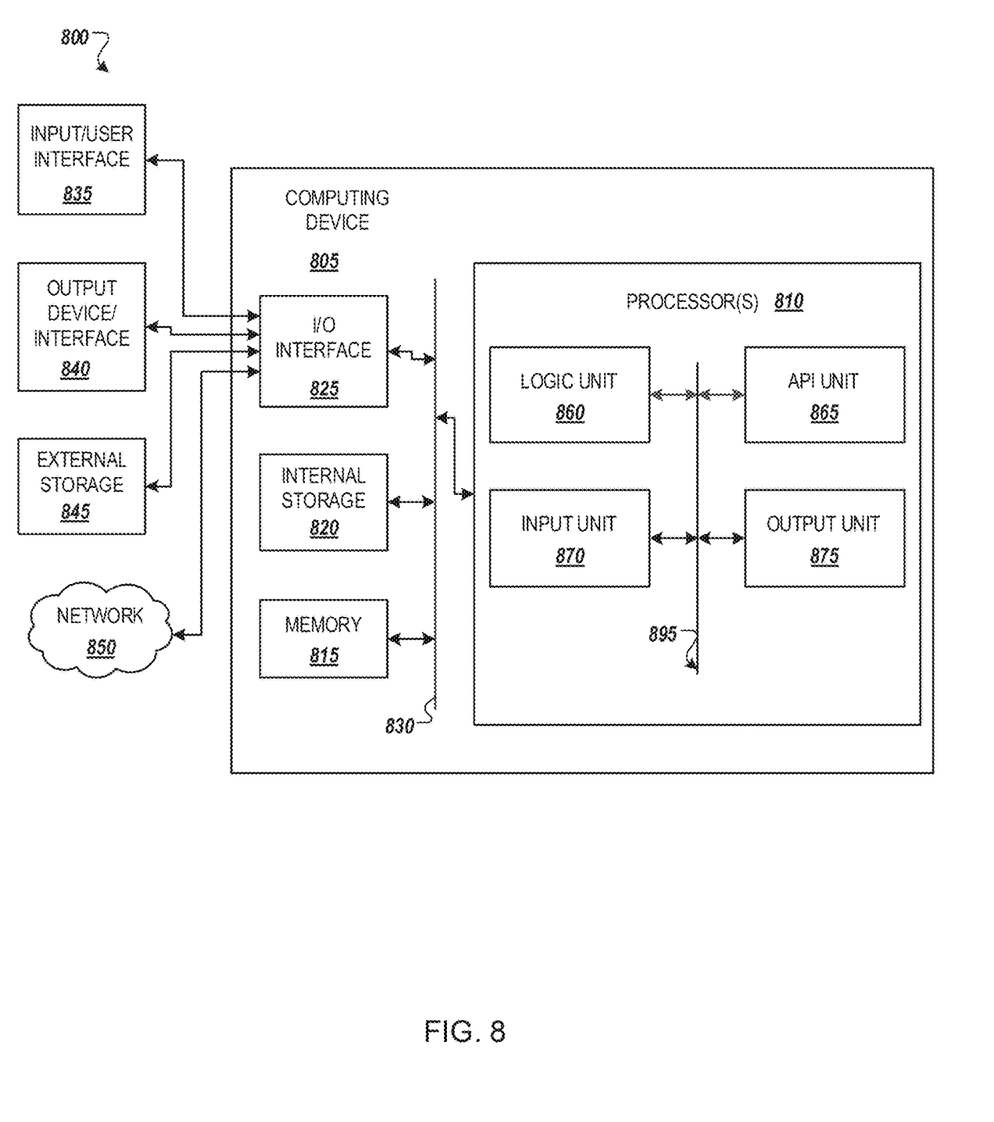
FIG. 8 illustrates an example computing environment with an example computer device suitable for use in some example implementations.

FIG. 8 illustrates an example computing environment with an example computer device suitable for use in some example implementations, such as a management apparatus 702 as illustrated in FIG. 7, or as an on-board computer of an asset 701. The computing environment can be used to facilitate implementation of the architectures illustrated in FIGS. 1 to 7. Further, any of the example implementations described herein can be implemented based on the architectures, blockchains, microservice systems and applications, and so on as illustrated in FIGS. 1 to 7. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805. I/O interface 825 is also configured to receive images from cameras or provide images to projectors or displays, depending on the desired implementation.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided. Processor(s) 810 can be in the form of hardware processors such as central processing units (CPUs) or in a combination of hardware and software units.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

Processor(s) 810 can be configured to execute a method or computer instructions involving receiving trip criteria; determining a trip route based on the trip criteria, the trip route comprising a plurality of sections and a plurality of modes of transportation for each section of the trip route, each section serviced by a modal mobility operator of multiple modal mobility operators; creating a digital single ticket comprising a single ticket for the plurality of sections of the trip, the digital single ticket being a smart contract with the multiple modal mobility operators; and dynamically updating the digital single ticket based on one or more operational events from one or more of the multiple modal mobility operators as illustrated in FIG. 2 and FIG. 4.

Processor(s) 810 can be configured to execute a method or computer instructions involving subscribing the digital single ticket to operational events and storing the operational events as updates to states of the digital single ticket, wherein dynamically updating the digital single ticket involving updating the states of the digital single ticket based on the stored operational events as illustrated in FIG. 5.

Processor(s) 810 can be configured to execute a method or computer instructions involving receiving updated trip criteria and dynamically updating the digital single ticket based on the updated trip criteria as illustrated in FIG. 4.

Processor(s) 810 can be configured to execute a method or computer instructions involving receiving updates from one or more of the multiple modal mobility channels; checking validity of the digital single ticket based on the received updates; and updating validation states of the digital single ticket into the smart contract as illustrated in FIG. 5.

Processor(s) 810 can be configured to, for each section of the trip route, execute a method or computer instructions involving detecting a passenger corresponding to the digital single ticket in a network of a modal mobility operator servicing a respective section of the trip route based on one or more of a device of the modal mobility operator detecting the passenger, a device of the passenger detecting the passenger in the network of the modal mobility operator, and a multiple modal mobility analytics engine detecting the passenger in the network of the modal mobility operator; and updating the digital single ticket based on detecting the passenger as illustrated in FIG. 4.

Processor(s) 810 can be configured to execute a method or computer instructions involving detecting transit motion of a passenger corresponding to the digital single ticket in the network of the modal mobility operator serving the respective section of the trip route based on one or more of a device of the modal mobility operator detecting the passenger, a device of the passenger detecting the passenger in the network of the modal mobility operator, and the multiple modal mobility analytics engine detecting the passenger in the network of the modal mobility operator as illustrated in FIGS. 4 and 5.

Processor(s) 810 can be configured to execute a method or computer instructions involving detecting a passenger corresponding to the digital single ticket departing from the network of the modal mobility operator servicing the respective section of the trip route based on one or more of a device of the modal mobility operator detecting the passenger departing from the network of the modal mobility operator, a device of the passenger detecting the passenger departing from the network of the modal mobility operator, and the multiple modal mobility analytics engine detecting the passenger departing from the network of the modal mobility operator; and updating the digital single ticket based on detecting the passenger departing the network of the modal mobility operator network as illustrated in FIGS. 4 and 5.

Processor(s) 810 can be configured to execute a method or computer instructions involving receiving a state update of the digital single ticket from the modal mobility operator servicing the respective section of the trip route; deriving a proof-of-transit from the received state update and endorse fare release; and updating the smart contract and releasing a fare to the modal mobility operator based on the derived proof-of-transit, the fare being a portion of an entire fare for the digital single ticket corresponding to the modal mobility operator servicing the respective section of the trip as illustrated in FIGS. 2, 4, and 5.

Processor(s) 810 can be configured to execute a method or computer instructions involving calculating incentivization and penalty values for at least one of the multiple modal mobility operators using the digital single ticket based on operational events and passenger feedback submitted to the smart contract; and updating a status of at least one of the multiple modal mobility operators and service providers based on the incentivization and penalty values as illustrated in FIGS. 3 to 6.

Processor(s) 810 can be configured to execute a method or computer instructions involving generating an application comprising a digital wallet, wherein the digital single ticket is stored in the application as illustrated in FIG. 2.

Processor(s) 810 can be configured to execute a method or computer instructions involving checking a digital balance of the digital wallet and applying a fare for the digital single ticket to an escrow account as illustrated in FIGS. 2, 4, and 5.

Processor(s) 810 can be configured to execute a method or computer instructions involving, based on a proof-of-transit for each modal mobility operator serving each section of the trip route, identifying portions of a fare of the entire single digital ticket and releasing of the portion of the fare to each modal mobility operator as illustrated in FIGS. 2, 4, and 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, performed by one or more processors, comprising:
   receiving trip criteria;
   determining a trip route based on the trip criteria on a blockchain channel, the trip route comprising a plurality of sections and a plurality of modes of transportation for each section of the trip route, each section serviced by a modal mobility operator of multiple modal mobility operators;
   creating a digital single ticket comprising a single ticket for the plurality of sections of the trip on the blockchain channel, the digital single ticket being a smart contract with the multiple modal mobility operators;
   dynamically updating the digital single ticket based on one or more operational events from one or more of the multiple modal mobility operators on the blockchain channel, wherein the operational events are processed by a multimodal mobility (MMM) analytics engine that suggests new routes or next best transit options for a remaining portion of a passenger journey;
   receiving updates of the trip criteria from one or more channels of the multiple modal mobility operators on the blockchain channel, wherein the blockchain channel comprises a consortium MMM channel that manages MMM exchange protocols, passenger agreements, operator service level agreements (SLAs), and valuation/incentivization protocols between organizations;
   checking validity of the digital single ticket based on the received updates on the blockchain channel, wherein checking validity includes validating passenger identity, extracting travel health guidelines, and facilitating payments through a passenger wallet in a single ticketing micro-application client;
   updating validation states of the digital single ticket into the smart contract on the blockchain channel;
   calculating incentivization and penalty values for at least one of the multiple modal mobility operators using the digital single ticket based on operational events and passenger feedback submitted to the smart contract;
   based on a proof-of-transit for each modal mobility operator serving each section of the trip route, identifying portions of a fare of the single digital ticket, wherein the proof-of-transit is generated using sensor fusion combining data from operator asset-based Internet of Things (IoT) systems including video, bar-code readers, and transit gates, along with passenger device tracking using Global Positioning Satellite (GPS), accelerometer, and compass data to detect passenger mode of travel; and
   updating and releasing of the portion of the fare to each modal mobility operator based on the incentivization and the penalty values on the blockchain channel,
   wherein the trip route is optimized through integration of information from the multiple modal mobility operators, and transfer time between the plurality of modes of transportation is reduced from trip route optimization,
wherein the penalty values comprise reductions in fare share.

2. The method of claim 1, further comprising subscribing the digital single ticket to operational events and storing the operational events as updates to states of the digital single ticket, wherein dynamically updating the digital single ticket comprises updating the states of the digital single ticket based on the stored operational events.

3. The method of claim 1, further comprising receiving updated trip criteria and dynamically updating the digital single ticket based on the updated trip criteria.

4. The method of claim 1, further comprising, for each section of the trip route:
   detecting a passenger corresponding to the digital single ticket in a network of a modal mobility operator servicing a respective section of the trip route based on one or more of a device of the modal mobility operator detecting the passenger, a device of the passenger detecting the passenger in the network of the modal mobility operator, and a multiple modal mobility analytics engine detecting the passenger in the network of the modal mobility operator; and
   updating the digital single ticket based on detecting the passenger.

5. The method of claim 4, further comprising:
   detecting transit motion of a passenger corresponding to the digital single ticket in the network of the modal mobility operator serving the respective section of the trip route based on one or more of a device of the modal mobility operator detecting the passenger, a device of the passenger detecting the passenger in the network of the modal mobility operator, and the multiple modal mobility analytics engine detecting the passenger in the network of the modal mobility operator.

6. The method of claim 5, further comprising:
   detecting a passenger corresponding to the digital single ticket departing from the network of the modal mobility operator servicing the respective section of the trip route based on one or more of a device of the modal mobility operator detecting the passenger departing from the network of the modal mobility operator, a device of the passenger detecting the passenger departing from the network of the modal mobility operator, and the multiple modal mobility analytics engine detecting the passenger departing from the network of the modal mobility operator; and
   updating the digital single ticket based on detecting the passenger departing the network of the modal mobility operator network.

7. The method of claim 6, farther comprising:
   receiving a state update of the digital single ticket from the modal mobility operator servicing the respective section of the trip route;
   deriving a proof-of-transit from the received state update and endorse fare release; and
   updating the smart contract and releasing a fare to the modal mobility operator based on the derived proof-of-transit, the fare being a portion of an entire fare for the digital single ticket corresponding to the modal mobility operator servicing the respective section of the trip.

8. The method of claim 1, further comprising:
   calculating incentivization values for the trip route using the digital single ticket based on operational events and historical travel data;
   submitting the incentivization values to the smart contract; and
   updating a passenger wallet corresponding a passenger associated with the digital single ticket based on the incentivization values.

9. The method of claim 1, further comprising generating an application comprising a digital wallet, wherein the digital single ticket is stored in the application.

10. The method of claim 9, further comprising checking a digital balance of the digital wallet and applying a fare for the digital single ticket to an escrow account.

11. The method of claim 9, wherein one or more of identity validations, travel authorization, and health compliance certificates are stored in the application.

12. A system comprising
at least one memory storing instructions; and
at least one processor coupled to a storage device and configured to execute the instructions to:
receive trip criteria;
determine a trip route based on the trip criteria on a blockchain channel, the trip route comprising a plurality of sections and a plurality of modes of transportation for each section of the trip route, each section serviced by a modal mobility operator of multiple modal mobility operators;
create a digital single ticket comprising a single ticket for the plurality of sections of the trip on the blockchain channel, the digital single ticket being a smart contract with the multiple modal mobility operators;
dynamically update the digital single ticket based on one or more operational events from one or more of the multiple modal mobility operators on the blockchain channel, wherein the operational events are processed by a multimodal mobility (MMM) analytics engine that suggests new routes or next best transit options for a remaining portion of a passenger journey;
receive updates of the trip criteria from one or more channels of the multiple modal mobility operators on the blockchain channel, wherein the blockchain channel comprises a consortium MMM channel that manages MMM exchange protocols, passenger agreements, operator service level agreements (SLAs), and valuation/incentivization protocols between organizations;
check validity of the digital single ticket based on the received updates on the blockchain channel, wherein checking validity includes validating passenger identity, extracting travel health guidelines, and facilitating payments through a passenger wallet in a single ticketing micro-application client;
update validation states of the digital single ticket into the smart contract on the blockchain channel;
calculate incentivization and penalty values for at least one of the multiple modal mobility operators using the digital single ticket based on operational events and passenger feedback submitted to the smart contract;
based on a proof-of-transit for each modal mobility operator serving each section of the trip route, identify portions of a fare of the single digital ticket, wherein the proof-of-transit is generated using sensor fusion combining data from operator asset-based Internet of Things (IoT) systems including video, bar-code readers, and transit gates, along with passenger device tracking using Global Positioning Satellite (GPS), accelerometer, and compass data to detect passenger mode of travel; and
update and release of the portion of the fare to each modal mobility operator based on the incentivization and the penalty values on the blockchain channel,
wherein the trip route is optimized through integration of information from the multiple modal mobility operators, and transfer time between the plurality of modes of transportation is reduced from trip route optimization,
wherein the penalty values comprise reductions in fare share.

13. A non-transitory computer readable medium, storing instructions for executing a process, performed by one or more processors, comprising:
receiving trip criteria;
determining a trip route based on the trip criteria on a blockchain channel, the trip route comprising a plurality of sections and a plurality of modes of transportation for each section of the trip route, each section serviced by a modal mobility operator of multiple modal mobility operators;
creating a digital single ticket comprising a single ticket for the plurality of sections of the trip on the blockchain channel, the digital single ticket being a smart contract with the multiple modal mobility operators;
dynamically updating the digital single ticket based on one or more operational events from one or more of the multiple modal mobility operators on the blockchain channel, wherein the operational events are processed by a multimodal mobility (MMM) analytics engine that suggests new routes or next best transit options for a remaining portion of a passenger journey;
receiving updates of the trip criteria from one or more channels of the multiple modal mobility operators on the blockchain channel, wherein the blockchain channel comprises a consortium MMM channel that manages MMM exchange protocols, passenger agreements, operator service level agreements (SLAs), and valuation/incentivization protocols between organizations;
checking validity of the digital single ticket based on the received updates on the blockchain channel, wherein checking validity includes validating passenger identity, extracting travel health guidelines, and facilitating payments through a passenger wallet in a single ticketing micro-application client;
updating validation states of the digital single ticket into the smart contract on the blockchain channel;
calculating incentivization and penalty values for at least one of the multiple modal mobility operators using the digital single ticket based on operational events and passenger feedback submitted to the smart contract;
based on a proof-of-transit for each modal mobility operator serving each section of the trip route, identifying portions of a fare of the single digital ticket, wherein the proof-of-transit is generated using sensor fusion combining data from operator asset-based Internet of Things (IoT) systems including video, bar-code readers, and transit gates, along with passenger device tracking using Global Positioning Satellite (GPS), accelerometer, and compass data to detect passenger mode of travel; and
updating and releasing of the portion of the fare to each modal mobility operator based on the incentivization and the penalty values on the blockchain channel,
wherein the trip route is optimized through integration of information from the multiple modal mobility operators, and transfer time between the plurality of modes of transportation is reduced from trip route optimization,
wherein the penalty values comprise reductions in fare share.

* * * * *